(12) United States Patent
Iwata

(10) Patent No.: US 11,206,820 B2
(45) Date of Patent: Dec. 28, 2021

(54) REEL SEAT AND FISHING ROD

(71) Applicant: SHIMANO INC., Sakai (JP)

(72) Inventor: Soshi Iwata, Sakai (JP)

(73) Assignee: SHIMANO INC., Sakai (JP)

( * ) Notice: Subject to any disclaimer, the term of this patent is extended or adjusted under 35 U.S.C. 154(b) by 320 days.

(21) Appl. No.: 16/321,558

(22) PCT Filed: Aug. 17, 2017

(86) PCT No.: PCT/JP2017/029572
§ 371 (c)(1),
(2) Date: Jan. 29, 2019

(87) PCT Pub. No.: WO2018/034329
PCT Pub. Date: Feb. 22, 2018

(65) Prior Publication Data
US 2019/0166816 A1    Jun. 6, 2019

(30) Foreign Application Priority Data

Aug. 19, 2016 (JP) .............................. JP2016-160950

(51) Int. Cl.
*A01K 87/06* (2006.01)
*A01K 87/08* (2006.01)
(52) U.S. Cl.
CPC .............. *A01K 87/06* (2013.01); *A01K 87/08* (2013.01)
(58) Field of Classification Search
CPC ................................ A01K 87/08; A01K 87/06
See application file for complete search history.

(56) References Cited

U.S. PATENT DOCUMENTS

| 2,186,515 A | * | 1/1940 | Yuncker | ................. | A01K 87/08 |
| | | | | | 43/22 |
| 2,583,831 A | * | 1/1952 | Goergen | ................. | A01K 87/08 |
| | | | | | 279/49 |
| 2,583,909 A | * | 1/1952 | Warth | .................... | A01K 87/08 |
| | | | | | 43/22 |

(Continued)

FOREIGN PATENT DOCUMENTS

| EP | 0461599 A1 | * | 12/1991 | ............. | B29C 70/74 |
| EP | 0563994 A2 | * | 10/1993 | ............. | A01K 87/06 |

(Continued)

OTHER PUBLICATIONS

International Search Report dated Nov. 7, 2017, issued in counterpart application No. PCT/JP2017/029572 (1 page).

*Primary Examiner* — Jessica B Wong
(74) *Attorney, Agent, or Firm* — Westerman, Hattori, Daniels & Adrian, LLP

(57) ABSTRACT

Provided is a reel seat including a cylindrical reel seat main body attached to a predetermined position of a rod main body. The reel seat main body includes fixed members 12, 13 fixed to the rod main body and including, on an upper surface, a reel leg mounting surface 5 configured to mount a reel leg, and a lower member 11 that is formed separately from the fixed members 12, 13, forms a lower region on an opposite side of the reel leg mounting surface 5, and can be detachably attached to the fixed members 12, 13 in a state where the fixed members 12, 13 are attached to the rod main body. A holding-use nut 3 is provided for holding the lower member 11 attached to the fixed members 12, 13.

14 Claims, 14 Drawing Sheets

(56) References Cited

U.S. PATENT DOCUMENTS

| | | | | | |
|---|---|---|---|---|---|
| 2,839,863 | A | * | 6/1958 | Heffel | A01K 87/06 43/22 |
| 3,744,173 | A | * | 7/1973 | Puyear | A01K 87/08 43/23 |
| 3,772,817 | A | * | 11/1973 | Bowerfind | A01K 87/06 43/22 |
| 4,648,196 | A | * | 3/1987 | Moody | A01K 87/06 43/23 |
| 4,693,029 | A | * | 9/1987 | Yamamoto | A01K 87/06 43/22 |
| 4,850,130 | A | * | 7/1989 | Childre | A01K 87/08 43/23 |
| 4,854,068 | A | * | 8/1989 | Maeda | A01K 87/08 43/18.5 |
| 4,860,484 | A | | 8/1989 | Green et al. | |
| 2003/0145509 | A1 | * | 8/2003 | Ito | A01K 87/06 43/22 |
| 2012/0317866 | A1 | | 12/2012 | Doucet | |

FOREIGN PATENT DOCUMENTS

| | | |
|---|---|---|
| JP | 10-309155 A | 11/1998 |
| JP | 4412693 B2 | 2/2010 |

\* cited by examiner

REEL SEAT AND FISHING ROD

TECHNICAL FIELD

The present invention relates to a reel seat used in a fishing rod for fixing a reel to a fishing rod and to a fishing rod including the reel seat.

BACKGROUND ART

A reel seat for fixing a double-bearing reel is known as a reel seat used in a fishing rod for fixing a reel to a fishing rod, for example. Such a reel seat includes, on an upper surface, a reel leg mounting surface for mounting a reel leg, and includes, on a lower surface, a trigger for hooking the fishing rod and a finger of a hand holding the reel. However, a position of the trigger may not be convenient, depending on a fisher. In view of this, the present applicant has already proposed, as described in Patent Literature 1 below, a configuration in which the fisher can move, in accordance with a size of the fisher's hand or a preference and the like, a lower main body part including the trigger to the rear and front to change the position of the trigger by configuring the lower main part unit moveable to the back and front with respect to an upper main body part.

The configuration has the big advantage of allowing for adjustment of the position of the trigger to the front and rear. However, a size, length, and angle of the trigger are constant. Thus, without refitting or disassembling the fishing rod, the fisher cannot change the trigger to a trigger of another specification in accordance with the fisher's preference, a condition, a type of the reel used, and the like. This point similarly applies to a configuration not including a trigger.

CITATION LIST

Patent Literature

PTL 1: Japanese Patent Publication No. 4412693

SUMMARY OF INVENTION

Technical Problem

An aim of the present invention is to provide a reel seat and a fishing rod in which a lower portion of a reel seat can be easily customized in accordance with a fisher's preference and a condition.

Solution to Problem

The present invention has been contrived in order to solve the above-mentioned problem. A reel seat according to the present invention is a reel seat including a cylindrical reel seat main body attached to a predetermined position of a rod main body. The reel seat main body includes a fixed member fixed to the rod main body and including, on an upper surface, a reel leg mounting surface for mounting a reel leg, and a lower member that is formed separately from the fixed member, forms a lower region on an opposite side of the reel leg mounting surface, and can be detachably attached to the fixed member in a state where the fixed member is attached to the rod main body. The reel seat further includes a holding member for holding an attached state of the lower member to the fixed member. Furthermore, an up-down direction is a direction when the reel leg mounting surface is an upper side, and depending on a usage state, an orientation is not limited to the reel leg mounting surface facing to the upper side, an orientation may also be so that the reel leg mounting surface faces to a lower side.

In this configuration of the reel seat, the lower member is detachable from the fixed member in a state where the fixed member of the reel seat main body is attached to the rod main body and the attached state of the lower member can be held by the holding member. Thus, a fisher can easily detach the lower member of the reel seat main body in a state where the reel seat is attached to the fishing rod. Therefore, when a lower member of another specification is available, the fisher can easily change to the lower member of the other specification, without requesting refitting or disassembling of the fishing rod from the manufacturer.

Specifically, it is preferable that the fixed member includes a locking unit configured to lock one end part of the lower member in the axial direction so that the one end part does not depart from the fixed member into a lower direction, and the holding member includes a cover unit that is moveable in the axial direction with respect to the fixed member and configured to cover the other end part of the lower member in the axial direction from a lower side. According to this configuration, both end parts of the lower member in the axial direction are supported from the lower side by the locking unit of the fixed member and the cover unit of the holding member and thus, a departure of the lower member into the lower direction is prevented and the attached state of the lower member is maintained.

Furthermore, in addition to the above-described configuration, it is preferable that the holding member includes a pressing unit configured to press, in the axial direction, the other end part of the lower member in the axial direction, the fixed member includes a receiving unit configured to receive the one end part of the lower member in the axial direction, and the lower member is sandwiched in the axial direction by the fixed member and the holding member. According to this configuration, the departure of the lower member into the lower direction is prevented by the locking unit of the fixed member and the cover unit of the holding member, and the lower member is sandwiched in the axial direction by the fixed member and the holding member, and thus, the attached state of the lower member becomes even more strong and the lower member is tightly fixed.

Furthermore, it is preferable that the receiving unit includes an inclined surface ascending toward the one end part in the axial direction and the inclined surface constitutes the locking unit. When the receiving unit of the fixed member thus includes the inclined surface, a force directed to an upper side is exerted on the lower member by the inclined surface of the fixed member when the lower member is pressed in the axial direction by the holding member and thus, the lower member can be fixed by pressing not only in the axial direction, but also to the upper side with respect to the fixed member. By disposing the inclined surface on the receiving unit of the fixed member in this way, the inclined surface also works as the locking unit and supports the fixed member from a lower side.

Furthermore, it is preferable that the fixed member includes an intermediate locking unit configured to restrict a downward movement of the midway part of the lower member in the axial direction. As described above, the lower member is pressed by the holding member in the axial direction. In this case, the midway part of the lower member in the axial direction has a tendency of displacing to a lower direction by bending to the lower direction and the like, however, when the intermediate locking unit is formed on the fixed member, the downward movement of the midway part of the lower member in the axial direction is restricted and the lower member is fixed more tightly.

Furthermore, it is preferable that the fixed member includes a fixed hood unit in which one end part of the reel leg is inserted, a hood-use male screw unit positioned at an outer peripheral surface on the side of one end part in the axial direction and into which a hood-use nut is screwed that serves for moving in the axial direction and fixing in a predetermined position a moveable hood in which another end part of the reel leg is inserted, and a holding-use male screw unit positioned more at the outer peripheral surface at the side of the other end part in the axial direction than the fixed hood unit. It is preferable that the holding member includes a holding-use nut screwed into the holding-use male screw unit of the fixed member. When the holding member includes the holding-use nut in this way, the holding member can be easily moved in the axial direction to press the lower member and further, can also easily be moved in the reverse direction, and thus, the lower member can be easily detached by removing the compressive force from the lower member. Furthermore, the lower member can also be detached and attached without detaching the reel from the reel seat.

Furthermore, it is preferable that the other end part of the lower member in the axial direction has a bent form in a circumferential direction when seen from the axial direction. It is preferable that a pressed surface orthogonal to the axial direction and a protrusion piece part protruding from a position on an inner side of the pressed surface in the radial direction into the axial direction, are formed on the other end part of the lower member in the axial direction. It is preferable that the holding member is cylindrical and one end part thereof constitutes a cylindrical cover unit, one end surface of the holding member constitutes the pressing unit, the cylindrical cover unit of the holding member covers the protrusion piece part of the lower member from an outer side in the radial direction, and the one end surface of the holding member exerts pressure on the pressed surface of the lower member. In this way, the cover unit of the holding member covers the protrusion piece part of the lower member from the outer side in the radial direction, and the one end surface of the holding member exerts pressure on the pressed surface of the lower member, and thus, the lower member can be surely fixed.

In this case, it is particularly preferable that the protrusion piece part of the lower member extends along the circumferential direction, an engaging protrusion extending in the circumferential direction is arranged on the outer peripheral surface of the protrusion piece part to protrude to the outer side in the radial direction, an engaging groove extending in the circumferential direction is formed on an inner peripheral surface of the cylindrical cover unit of the holding member, and the engaging protrusion of the lower member is engaged with the engaging groove of the holding member. When the engaging protrusion of the lower member is engaged with the engaging groove of the holding member in this way, the lower member can be fixed even more tightly.

Furthermore, it is preferable that the protrusion piece part extends upwards beyond a length of a lower-side half-circle and the engaging protrusion is formed over an entire length of the protrusion piece part in the circumferential direction, and thus, the lower member can be fixed even more tightly.

Moreover, it is preferable that the pressed surface extends further to the upper side than the protrusion piece part and thus, the compressive force from the holding member can be exerted even more surely on the lower member and the lower member can be sandwiched even more surely.

Furthermore, it is preferable that the fixed member includes a main body member formed by injection molding and in which the reel leg mounting surface, the fixed hood unit, and the hood-use male screw unit are formed, and a cylindrical member formed by injection molding, formed separately from the main body member, and connected to a side of the other end part of the main body member in the axial direction, and the holding-use male screw unit is formed in the cylindrical member. Together with the fixed hood unit and the like, the holding-use male screw unit may be formed integrally with the fixed member, however, when the holding-use male screw unit is formed on the cylindrical member that is formed separately from the main body member, a position of the holding-use male screw unit can be easily changed. That is, the main body member has a complicated structure, and thus, a change of the metal mold of the main body member is not desirable in regards to cost. On the other hand, the position of the holding-use male screw unit can be changed in accordance with the fishing rod. Thus, by separating the cylindrical member from the main body member to make the cylindrical member an independent structure and by forming the holding-use male screw unit on the cylindrical member, the position and length of the holding-use male screw unit can be changed at low cost, without changing the metal mold of the main body member.

Furthermore, it is preferable that a cover piece unit that is arc-shaped when seen from the axial direction, is arranged on the other end part of the main body member in the axial direction to protrude into the axial direction and from among an entire circumference of a connecting part of the main body member and the cylindrical member, an upper region is covered by the cover piece unit of the main body member from an outer side in the radial direction and a remaining lower region is covered by the lower member from the outer side in the radial direction, and thus, the connecting part of the main body member and the cylindrical member can be easily concealed.

In particular, it is preferable that the pressed surface of the lower member protrudes slightly more to the side of the other end part in the axial direction than an end surface of the cover piece unit of the main body member and thus, the lower member can be surely sandwiched by exerting pressure in the axial direction.

Furthermore, it is preferable that the holding member includes a pressing cylindrical body that is moveable in the axial direction, but not rotatable, and a holding-use nut positioned on a side of another end part of the pressing cylindrical body in the axial direction, locked rotatably relative to the pressing cylindrical body, and configured to move the pressing cylindrical body in the axial direction. By providing the pressing cylindrical body in this way, the holding-use nut can be disposed away from the fixed member. In the arrangement in which the holding-use nut is positioned away from the fixed member, a hand holding the reel seat can be prevented from touching the holding-use nut during fishing and thus, the holding-use nut can be prevented from loosening.

Furthermore, the fishing rod according to the present invention includes the reel seat described above.

Advantageous Effects of Invention

As described above, the lower member of the reel seat can be detached and attached in a state where the reel seat is attached to the fishing rod, and thus, the fisher can detach or attach the lower member and can change the lower member to a lower member of another specification in accordance with the fisher's preference, a condition, a type of the reel used, and the like.

DESCRIPTION OF EMBODIMENTS

Figure 1:
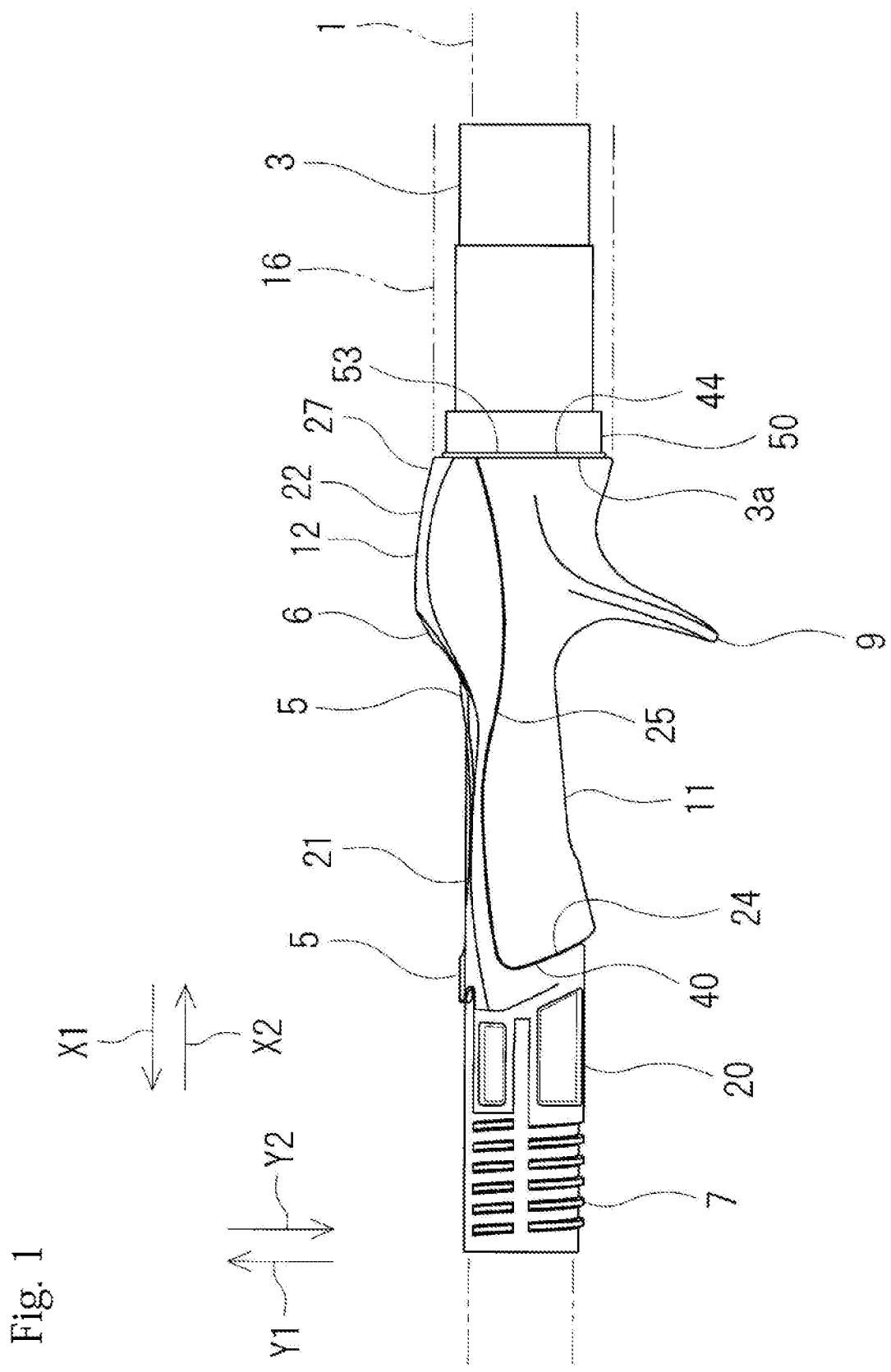
FIG. 1 is a front view of a reel seat according to an embodiment of the present invention.
Figure 2:
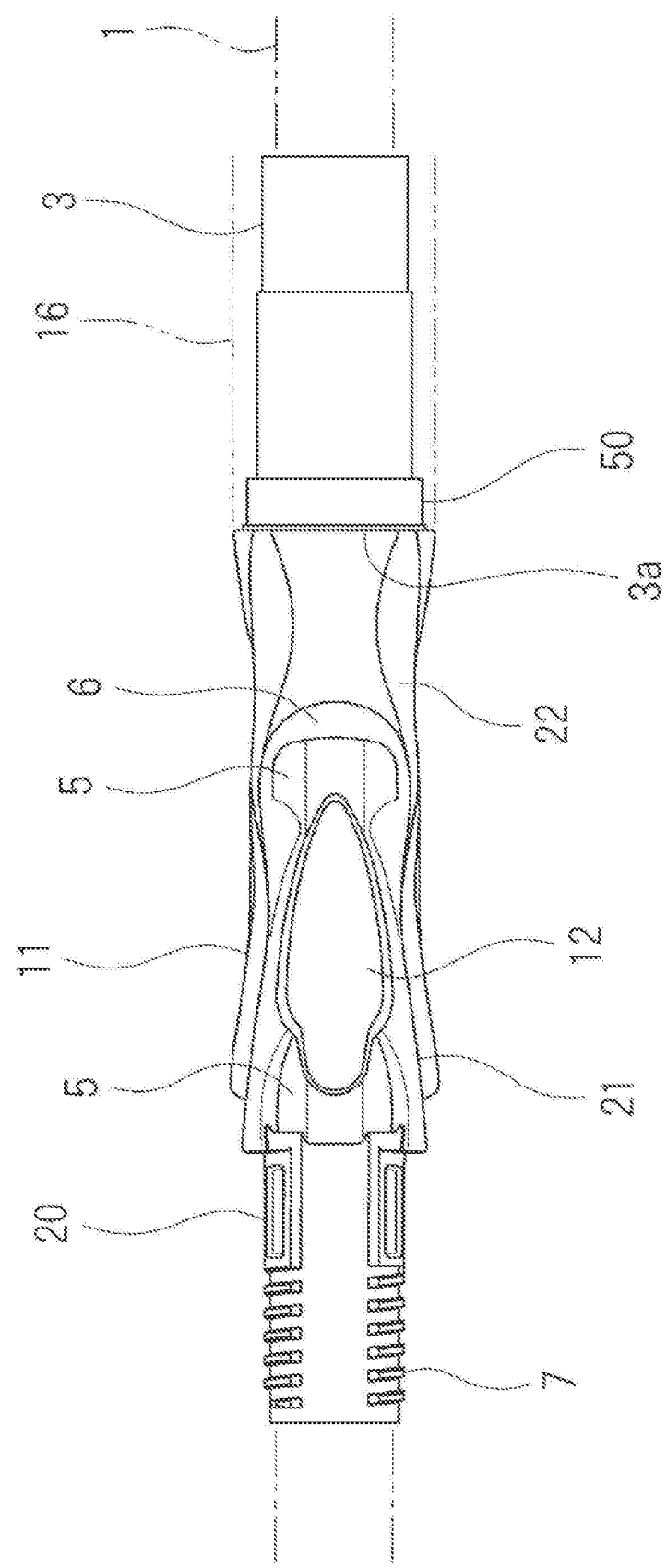
FIG. 2 is a plan view of the reel seat.

Below, a reel seat according to an embodiment of the present invention will be described with reference to FIGS. 1 to 13. The reel seat according to the present embodiment is used for attaching a double-bearing reel to a fishing rod and the double-bearing reel typically faces to an upper side in a usage state. However, the reel seat may also be used for attaching a spinning reel and in this case, the spinning reel faces to a lower side in the usage state. Hereinafter, an axial direction of the reel seat is referred to as a front-rear direction, a side of one end part of the axial direction is assumed to be a front side and a side of the other end part of the axial direction is assumed to be a rear side. In FIG. 1, a front side is indicated by an arrow X1 and a rear side is indicated by an arrow X2, however, the front side and rear side may be arranged inversely. Furthermore, a later-described reel leg mounting surface 5 is assumed to be an upper side and an opposite side thereof is assumed to be a lower side. In FIG. 1, the upper side is indicated by an arrow Y1 and the lower side is indicated by an arrow Y2. The reel seat is a cylindrical structure mounted to an outside of a rod main body 1 (blank) and includes a reel seat main body, a holding-use nut 3 as a holding member, a hood-use nut (not illustrated), and a moveable hood.

The reel seat main body has a cylindrical shape as a whole and the rod main body 1 is inserted in an inside of the reel seat main body. Thus, the reel seat main body includes a rod insertion aperture 4 in which the rod main body 1 is inserted. The reel seat main body is attached at a predetermined position of the rod main body 1. The reel seat main body is directly fixed by adhesion to an outer peripheral surface of the rod main body 1 or is fixed by adhesion via a cylindrical spacer (not illustrated) between the outer peripheral surface of the rod main body 1 and the reel seat main body, for example.

The reel seat main body includes the reel leg mounting surface 5, a fixed hood unit 6, a hood-use male screw unit 7, a holding-use male screw unit 8, and a trigger 9. The reel leg mounting surface 5 is a portion for mounting a reel leg (not illustrated) and is formed on an upper surface of the reel seat main body. On a rear side of the reel leg mounting surface 5, the fixed hood unit 6 is formed to which a rear end part of the reel leg is inserted from a front side. Furthermore, on an outer peripheral surface of a front part of the reel seat main body, the hood-use male screw unit 7 is formed into which the hood-use nut is screwed. The moveable hood is positioned at a rear side of the hood-use nut and the moveable hood is moveable in the front-rear direction, but not rotatable, with respect to the reel seat main body. The moveable hood has a cylindrical shape and on an upper part from among the entire circumference of the moveable hood, a hood unit is partially formed that bulges to an outer side in the radial direction and a front end part of the reel leg is inserted into the hood unit from the rear side. A rear end part of the hood-use nut is locked rotatably relative to a front end part of the moveable hood and when the hood-use nut moves to the front or rear while rotating, the moveable hood moves to the front or rear in accordance with the movement, but does not rotate. The moveable hood can be approached to the fixed hood unit 6 by moving the hood-use nut to the rear side and the reel leg is sandwiched from the front side and rear side thereof by the moveable hood and the fixed hood unit 6, thereby the reel leg is fixed. On the other hand, when the hood-use nut is moved to the front side, the moveable hood is moved away from the fixed hood unit 6 to the front side and the reel can be detached from the fishing rod.

On an outer peripheral surface of a rear part of the reel seat main body, the holding-use male screw unit 8 is formed into which the holding-use nut 3 is screwed. The holding-use male screw unit 8 is positioned more on the rear side than the fixed hood unit 6. Note that a smooth outer peripheral surface on which no male screw unit is formed is present on a rear side of the holding-use male screw unit 8 until the rear end and a length of the smooth outer peripheral surface is equal to or longer than a length of the holding-use male screw unit 8.

The trigger 9 is formed on a lower surface of the reel seat main body. The trigger 9 is used for hooking a finger, is arranged to protrude to a lower direction, and is slightly inclined to the front. The trigger 9 is formed in a position on a lower side opposite to the fixed hood unit 6. Note that, in the present embodiment, a through hole 10 is formed at a lower surface of the reel seat main body, and the through hole 10 is positioned on a front side of the trigger 9. The through hole 10 communicates with the rod insertion aperture 4 and the rod main body 1 is exposed via the through hole 10. Thus, a finger can touch a portion of the rod main body 1 exposed from the through hole 10.

In the present embodiment, the reel seat main body includes a fixed member and a lower member 11 that is formed separately from the fixed member. The fixed member is fixed to the rod main body 1 by adhesion. The fixed member constitutes a main part of the reel seat main body and includes the hood-use male screw unit 7, the reel leg mounting surface 5, and the holding-use male screw unit 8. The lower member 11 constitutes a lower portion of the reel seat main body, can be removed in a lower direction with respect to the fixed member, and is attached detachably in the lower direction. The trigger 9 and the through hole 10 are formed in the lower member 11.

Fixed Member

The fixed member may be configured from one member, however, in the present embodiment, the fixed member is configured from two members on the front and rear that are formed separately from each other. That is, the fixed member is configured from a main body member 12 that is a front portion and a main part of the fixed member and a cylindrical member 13 that constitutes a rear portion of the fixed member. The main body member 12 and the cylindrical member 13 are connected to each other in the front-rear direction. Specifically, a rear end surface 12a of the main body member 12 and a front end surface 13a of the cylindrical member 13 are in surface contact so to face each other in the front-rear direction and the main body member 12 and the cylindrical member 13 are united by a screw 14. However, an attachment method of the main body member 12 and the cylindrical member 13 is not limited to the screw 14 and any method such as adhesion and the like may be used.

Main Body Member 12

The reel leg mounting surface 5, the fixed hood unit 6, and the hood-use male screw unit 7 are formed on the main body member 12. The main body member 12 has a cylindrical shape as a whole, however, in a midway part of the main body member 12 in the front-rear direction, from among the entire circumference, a region of about half of the lower side is cut out to leave only a region of about half of the upper side. That is, the main body member 12 is divided, in order from the front side, into a cylindrical front tube unit 20, a half-cut unit 21 having an upper-half cut shape of only the upper side, and a cylindrical rear tube unit 22. The hood-use male screw unit 7 is formed on the front tube unit 20, the reel leg mounting surface 5 is formed mainly on an upper surface of the half-cut unit 21, and the fixed hood unit 6 is formed on the rear tube unit 22. In this way, the half-cut unit 21 is configured as a half-cut shape of only the upper region and thus, the rod insertion aperture 4 opens to a lower direction of the half-cut unit 21. Furthermore, the front tube unit 20 and the rear tube unit 22 that are two tube units, are formed on the front and rear of the half-cut unit 21, and the main body member 12 is directly or indirectly fixed to the front tube unit 20 and the rear tube unit 22 over the entire circumference on the outer peripheral surface of the rod main body 1 and thus, the main body member 12 can be surely fixed to the rod main body 1, even when including the half-cut unit 21. Apart from a rear end part of the front tube unit 20, the front tube unit 20 is exposed to the outside without being covered by the lower member 11, however, an upper region of the rear tube unit 22 is exposed to the outside without being covered by the lower member 11, while a lower region of the rear tube unit 22 is covered by the lower member 11 and thus not exposed to the outside.

Figure 3:
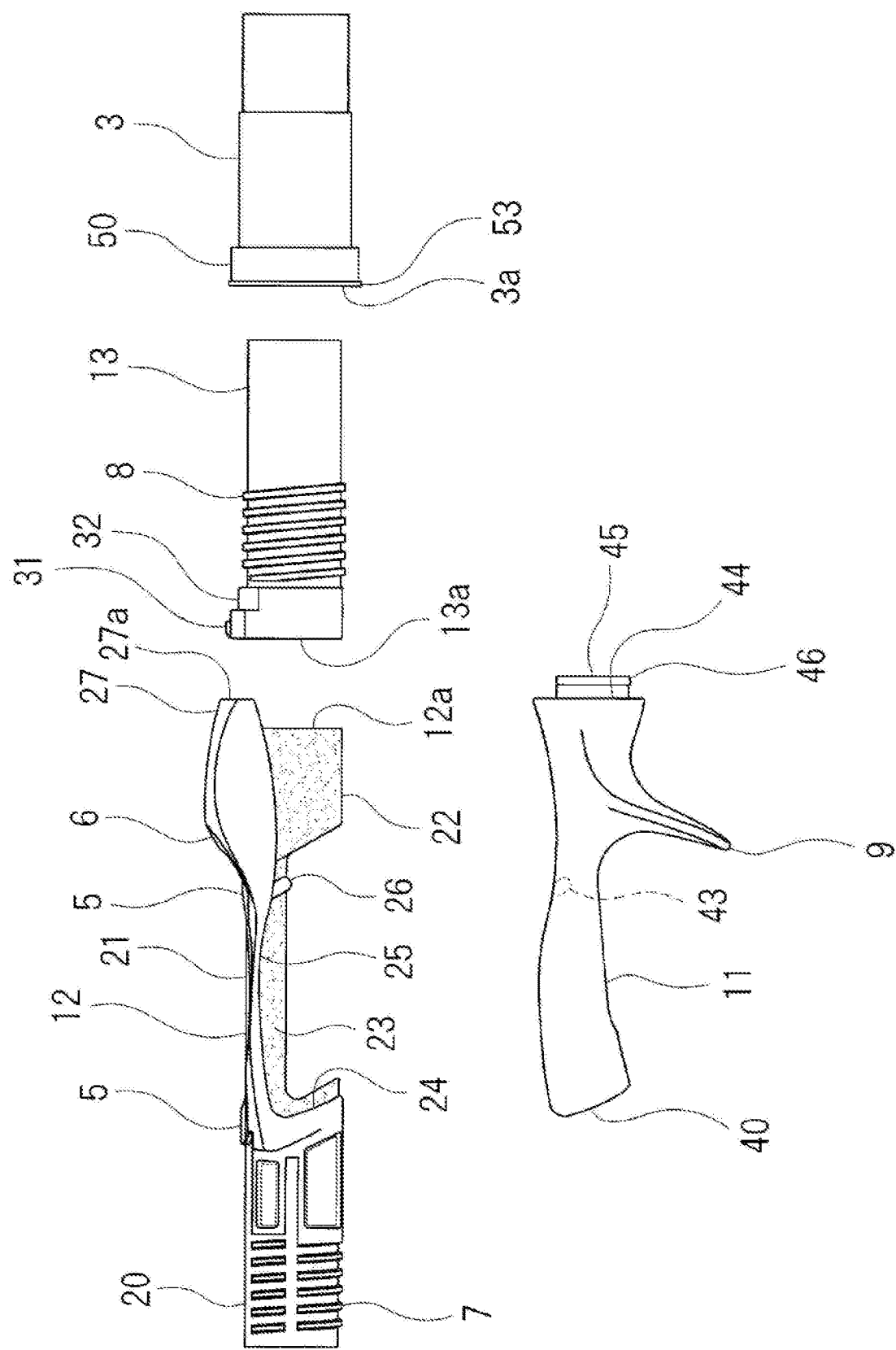
FIG. 3 is an exploded view of the reel seat.
Figure 4:
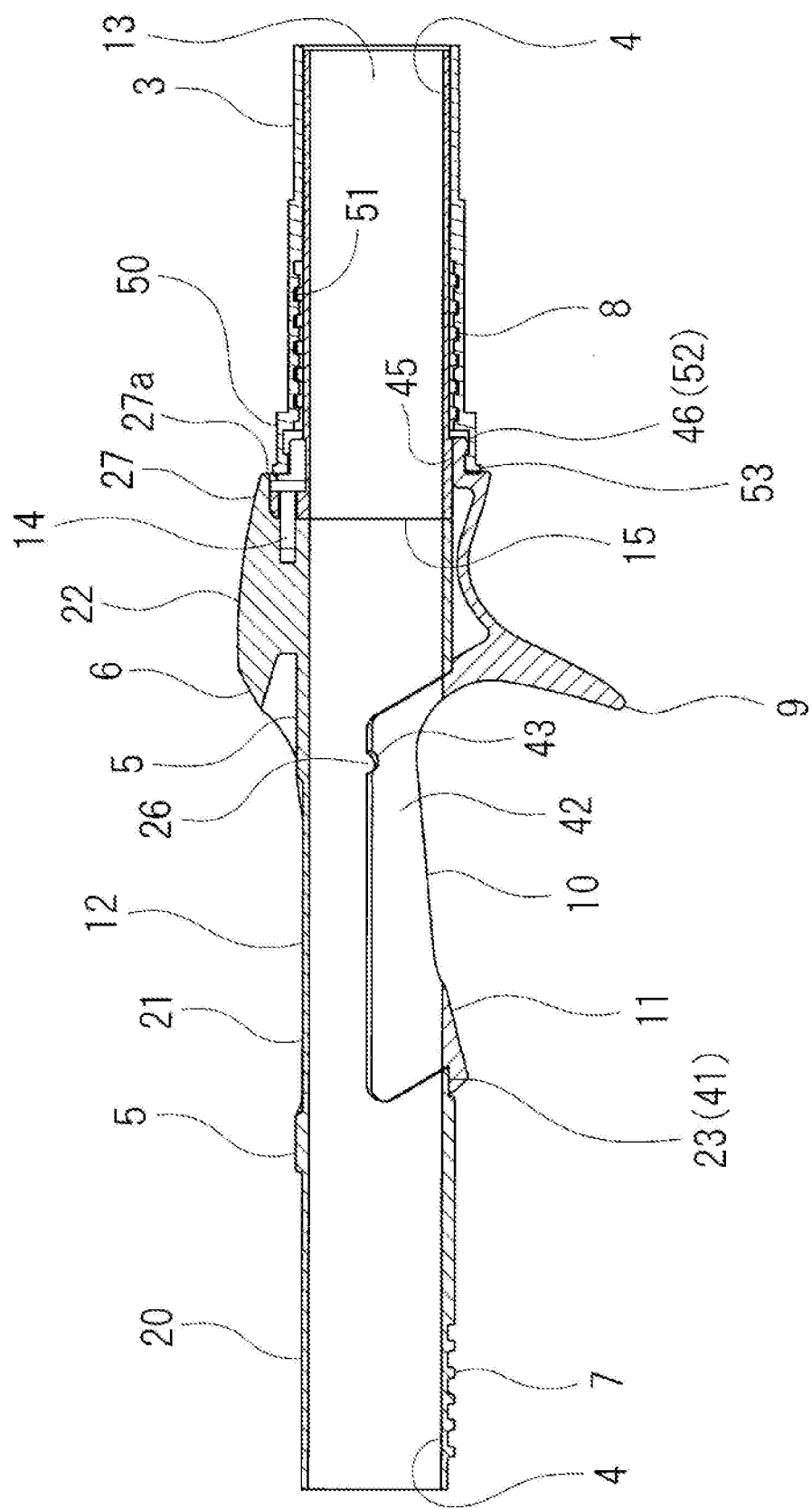
FIG. 4 is a longitudinal sectional view of the reel seat cut along the axial direction.
Figure 5:
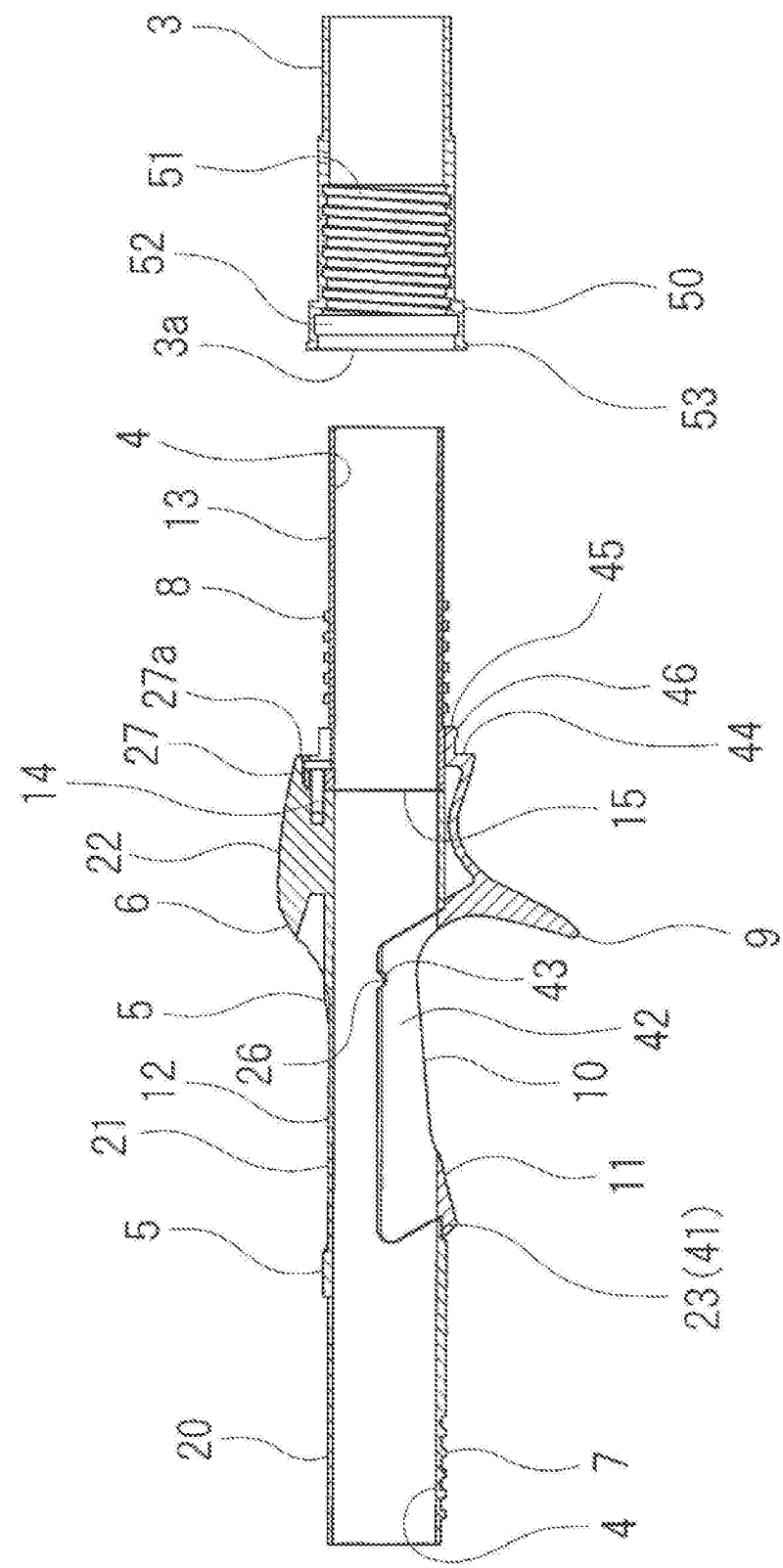
FIG. 5 is a longitudinal sectional view of the reel seat cut along the axial direction and illustrates a state where a holding-use nut is detached.
Figure 6:
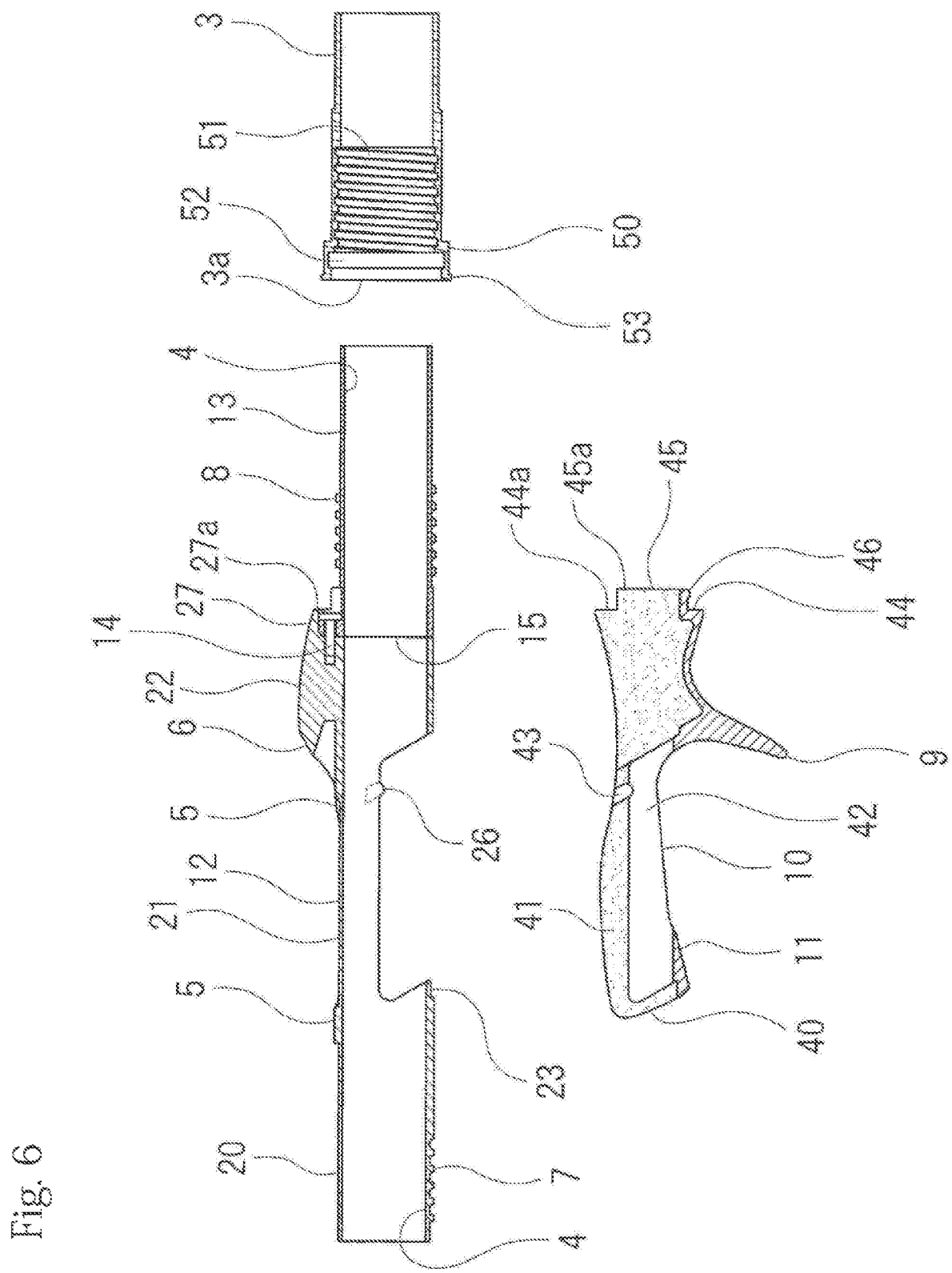
FIG. 6 is a longitudinal sectional view of the reel seat cut along the axial direction and illustrates a state where the holding-use nut and a lower member are detached.

The lower member 11 is attached to the main body member 12 from the lower direction. Thus, an overlapping surface 23 is formed on an outer surface of a lower portion of the main body member 12, in which the lower member 11 overlaps from an outer side in the radial direction with the main body member 12. In FIG. 3 and the like, a location of the overlapping surface 23 is indicated by multiple dots. On the overlapping surface 23, the main body member 12 and the lower member 11 overlap on an inside and outside to form a double structure. Specifically, the overlapping surface 23 is formed from a lower part of the rear end part of the front tube unit 20 to a lower part of the half-cut unit 21 and the rear tube unit 22 and cannot be seen due to being covered by the lower member 11 in a state where the lower member 11 is attached to the main body member 12.

The overlapping surface 23 is formed to be positioned more on an inner side of the radial direction with respect to an outer surface of the main body member 12. That is, a stepped unit is formed at a boundary part between the overlapping surface 23 and the outer surface of the main body member 12. The stepped unit is configured from a front stepped unit 24 positioned at a front end part of the overlapping surface 23 and an upper stepped unit 25 extending in a rear direction from an upper end part of the front stepped unit 24 until reaching a rear end part of the main body member 12. The front stepped unit 24 is directed from a bottommost part to both left and right sides, has a left-right symmetry relation, extends upwards, and has an approximately U-shaped form seen from the front-rear direction. More specifically, the front stepped unit 24 extends from the bottommost part in the upward direction, while inclining to the front, and thus, the front stepped unit 24 has an inclined surface ascending toward the front. The inclined surface is formed on each of the left and right side. In the present embodiment, the inclined surface is formed over an entire length of a front stepped unit 23. Furthermore, the front stepped unit 24 constitutes a receiving unit configured to receive a front end part of the lower member 11 and constitutes a locking unit configured to lock the front end part of the lower member 11 from a lower side.

In the half-cut unit 21, the overlapping surface 23 extends in the front-rear direction to form a left-right pair. Locking projection units 26 are formed as intermediate locking units on each of the overlapping surfaces 23 left-right pair of overlapping surfaces 23 in the half-cut unit 21. The left and right overlapping surfaces 23 respectively face left and right towards the outside and the locking projection units 26 are arranged to project left and right towards the outside. The locking projection units 26 extend from the upper stepped unit 25 downwards and rearwards and a lower end part of the locking projection units 26 protrudes more downwards than a lower end part of the overlapping surfaces 23. Note that the lower end part of the locking projection units 26 is curved in an arc-shaped form in the front-rear direction. The locking projection units 26 are positioned in a rear part of the half-cut unit 21, are positioned in a center part of the upper stepped unit 25, and the locking projection units 26 of the left-right pair of locking projection units 26 are arranged opposite from each other.

Figure 7:
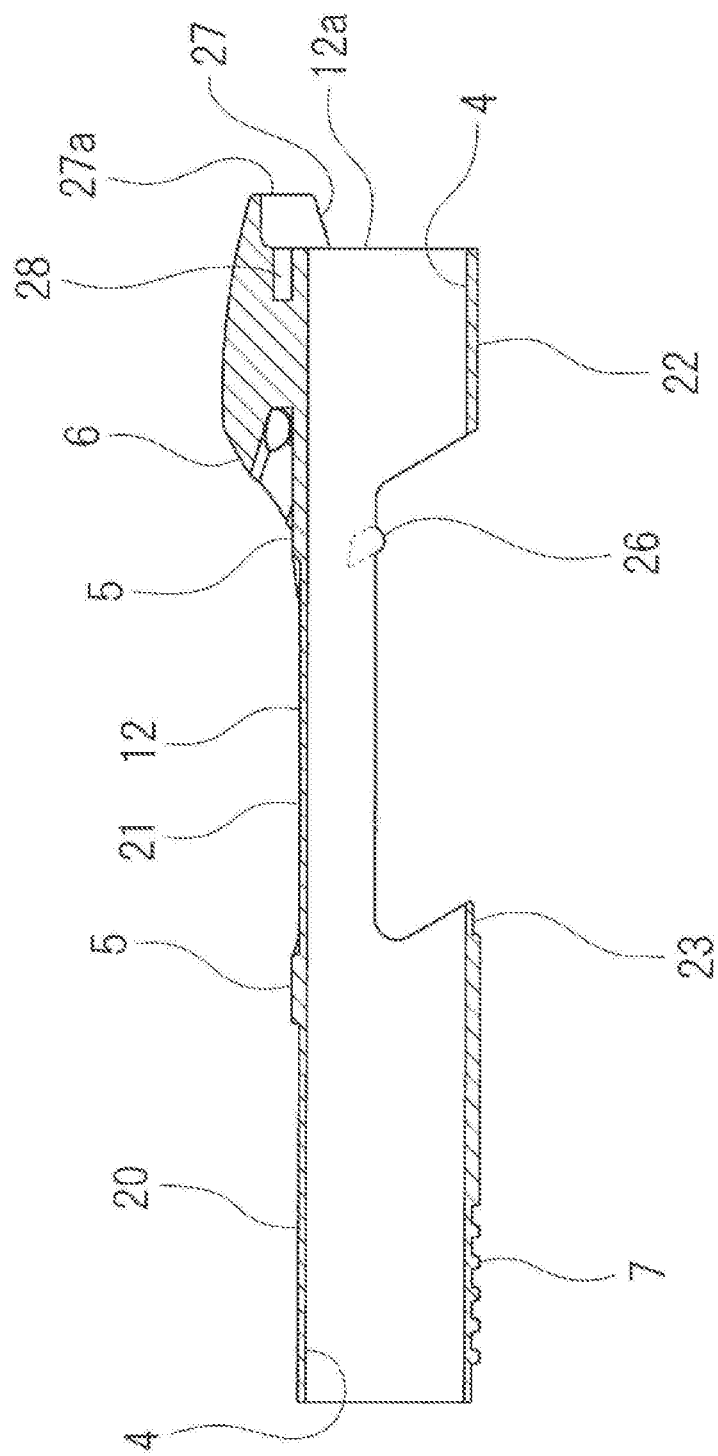
FIG. 7 is a longitudinal sectional view of a main body member of the reel seat cut along the axial direction.
Figure 10A:
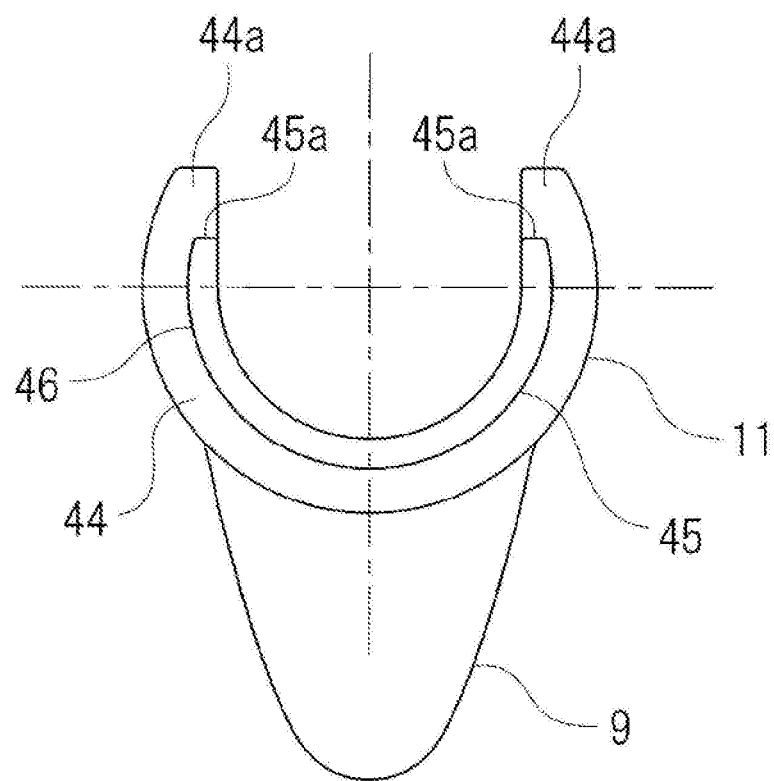
FIG. 10A is a side view of the lower member of the reel seat seen from a side of another end part in an axial direction.
Figure 10B:
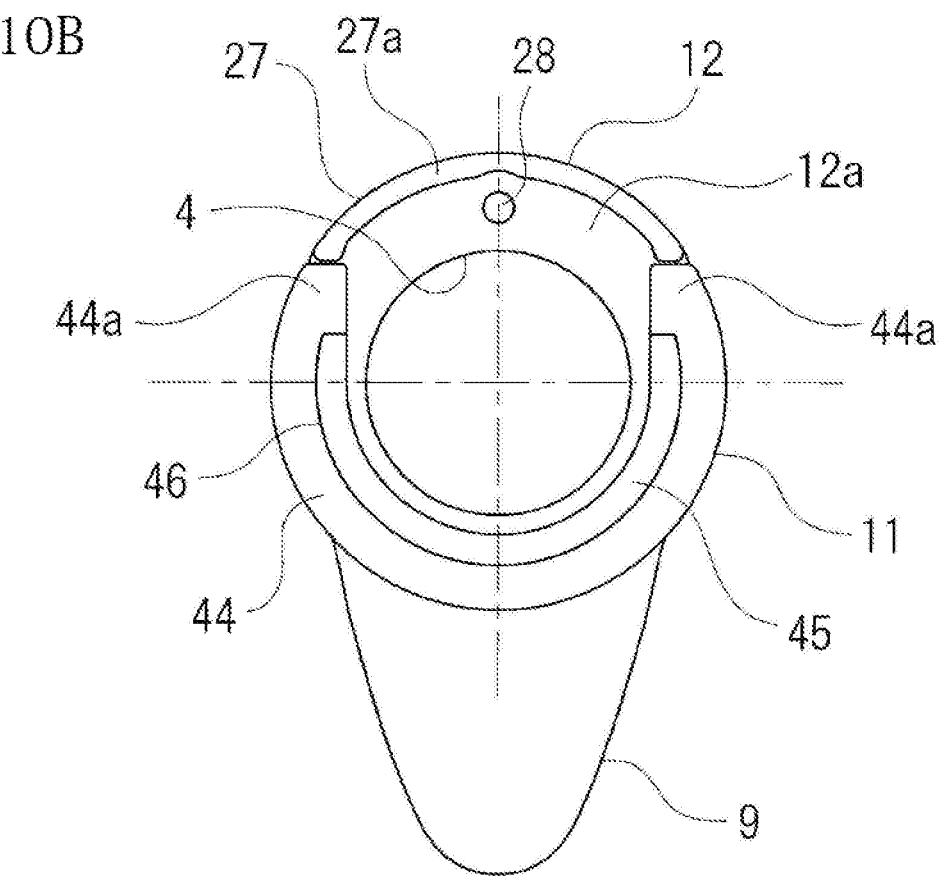
FIG. 10B is a side view of the lower member and the main body member of the reel seat seen from the side of the other end part in the axial direction.

As illustrated in FIG. 7, the rear end surface 12a of the main body member 12 is a connecting surface with the cylindrical member 13. The connecting surface is a surface orthogonal to the front-rear direction and is formed over an entire circumference of a rear end opening of the rod insertion aperture 4. On an upper part of the connecting surface, a cover piece unit 27 is arranged to protrude rearwards in an eaves-like shape. As illustrated in FIG. 10B, the cover piece unit 27 has an arc-shaped form when seen from the rear and a central angle of the cover piece unit 27 is less than 180 degrees. Furthermore, a dimension of an upper part from among the entire circumference of the connecting surface becomes locally greater in the radial direction and in a center part of the upper part of the connecting surface in the left-right direction, a prepared hole 28 is formed for screw-fastening the cylindrical member 13 to the main body member 12. The prepared hole 28 is positioned immediately below a base end part of the cover piece unit 27.

Cylindrical Member 13

The front end surface 13a of the cylindrical member 13 is a connecting surface of the cylindrical member 13. The connecting surface of the cylindrical member 13 is also a surface orthogonal to the front-rear direction, the connecting surface of the cylindrical member 13 abuts against the connecting surface of the main body member 12 from a rear side, and the main body member 12 and the cylindrical member 13 are connected to each other on the same axis to form one structure. A first bulging unit 31 and a second bulging unit 32 are formed on an outer peripheral surface of a front part of the cylindrical member 13. The first bulging unit 31 is positioned on a front end part of the cylindrical member 13 and the second bulging unit 32 is connected consecutively to a rear side of the first bulging unit 31. The first bulging unit 31 bulges upwards in a flange shape and enters an inner side of the cover piece unit 27 of the main body member 12 in the radial direction when the cylindrical member 13 is attached to the main body member 12. That is, the first bulging unit 31 is covered by the cover piece unit 27 from an outer side in the radial direction and a rear surface of the first bulging unit 31 approximately flushes with a rear end surface of the cover piece unit 27. An upper surface of the first bulging unit 31 is a peripheral surface curved in the circumferential direction (curved surface) and faces an inner surface of the cover piece unit 27. Similarly to the first bulging unit 31, the second bulging unit 32 bulges upwards in a flange shape, however, a height of the second bulging unit 32 is lower than a height of the first bulging unit 31 and an extent of upwards bulging of the second bulging unit 32 is small. An upper surface of the second bulging unit 32 is also a peripheral surface curved in the circumferential direction and is positioned on approximately the same circle at approximately the same radius as an outer peripheral surface of a later-described protrusion piece part 45 of the lower member 11.

Figure 8:
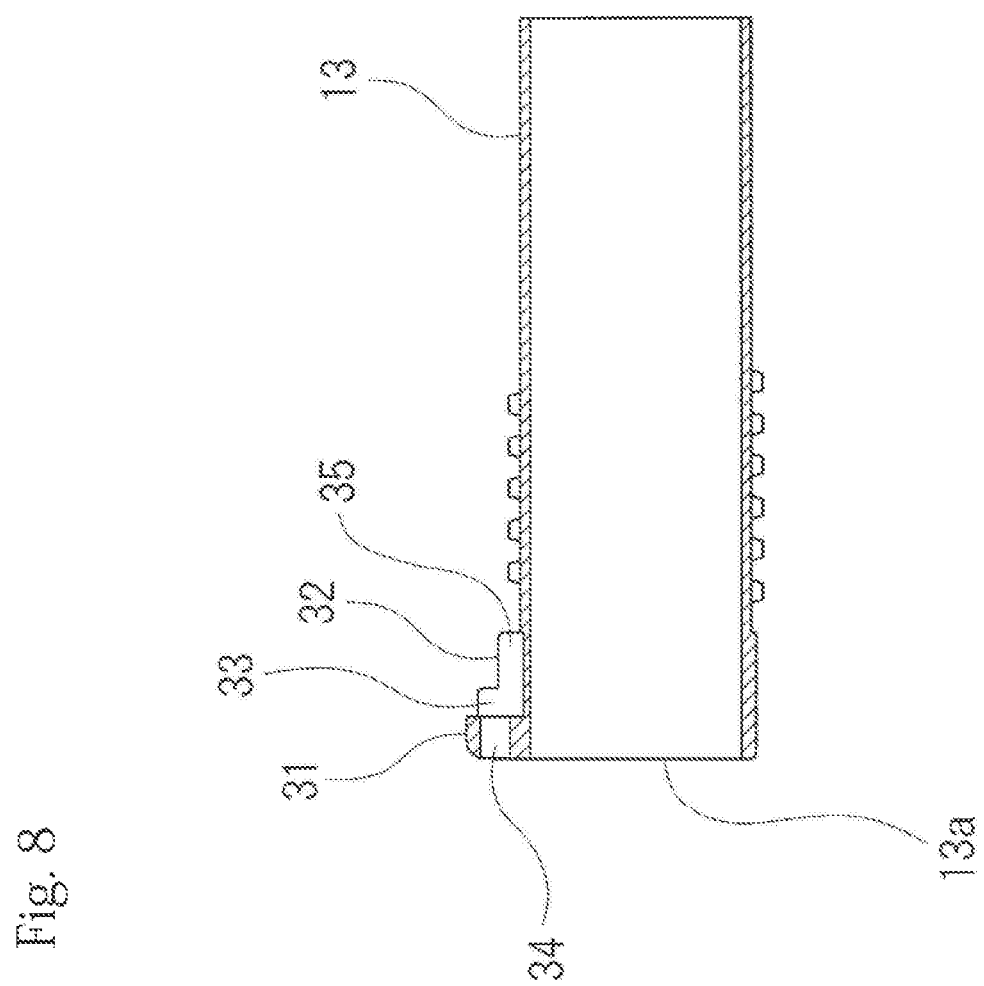
FIG. 8 is a longitudinal sectional view of a cylindrical member of the reel seat cut along the axial direction.

As illustrated in FIG. 8, an upwardly open counterbore recessed unit 33 for the screw 14 is formed on a top part of the upper surface of the first bulging unit 31, a screw-use through hole 34 is formed on a front side of the counterbore recessed unit 33, and the screw 14 is screwed into the prepared hole 28 of the main body member 12 from the counterbore recessed unit 33 via the screw-use through hole 34. In this way, the cylindrical member 13 is screw-fastened to the main body member 12 by the one screw 14 in the top part of the first bulging unit 31. The screw 14 functions as a temporary fastening and also serves for positioning in the circumferential direction between the main body member 12 and the cylindrical member 13. The cylindrical member 13 is screw-fastened in the upper part of the main body member 12 by the one screw 14 when viewed as the reel seat alone, however, both of the main body member 12 and the cylindrical member 13 are adhered to the rod main body 1 when the reel seat is attached to the rod main body 1. Note that a head part of the screw 14 is positioned at an inner side of the cover piece unit 27 of the main body member 12 and is concealed by the inner side of the cover piece unit 27. On a top part of the upper surface of the second bulging unit 32, a recessed groove 35 that is continuous to the counterbore recessed unit 33 of the first bulging unit 31 is formed to cross the second bulging unit 32 in the front-rear direction. During assembling work for combining the cylindrical member 13 with the main body member 12, the screw 14 can be tightened from the recessed groove 35 by a screwdriver, for example. The holding-use male screw unit 8 is formed at a rear side of the second bulging unit 32 and an outer peripheral surface of a portion from a rear end part of the holding-use male screw unit 8 to a rear end part of the cylindrical member 13 is a smooth outer peripheral surface without any unevenness.

Lower Member 11

The lower member 11 covers from below a lower opening that opens at a lower side of the half-cut unit 21 of the main body member 12. The lower member 11 as a whole is formed as a lower half-cut shape and forms approximately an arc shape of a half circle or approximately a U-shape in a cross-sectional view. A front end part 40 of the lower member 11 has a form corresponding to the front stepped unit 24 of the main body member 12. The front stepped unit 24 of the main body member 12 has a left-right pair of inclined surfaces and thus, the front end part 40 of the lower member 11 also has an inclined surface corresponding thereto and extending from the bottommost part while inclining to the front and upwards. The inclined surface of the front end part 40 of the lower member 11 is locked by the inclined surface that is the locking unit of the main body member 12. Thus, the inclined surface of the front end part 40 of the lower member 11 constitutes a portion to be locked.

An overlapping surface 41 corresponding to the overlapping surface 23 of the main body member 12 is formed on an inner surface of the lower member 11. Note that, in FIG. 6 and the like, a location of the overlapping surface 41 of the lower member 11 is indicated by multiple dots. From among the inner surface of the lower member 11, a portion except from the overlapping surface 41 constitutes a wall surface 42 of the rod insertion aperture 4, however, the overlapping surface 41 is formed more on the outer side of the radial direction than the wall surface 42 of the rod insertion aperture 4. Furthermore, on an inner surface of a midway part of the lower member 11 in the front-rear direction, locking recessed units 43 are formed in which the locking projection units 26 of the main body member 12 are engaged. The locking recessed units 43 are formed as a left-right pair, correspond to the locking projection units 26 of the main body member 12, and are formed directed inclined rearwards from an upper end part of the lower member 11. Note that the locking recessed units 43 are formed on the overlapping surface 41, however, a lower end part of the locking recessed units 43 slightly exceeds the overlapping surface 41 in the lower direction and reaches the wall surface 42 of the rod insertion aperture 4.

On a rear end part of the lower member 11, a pressed surface 44 that is a surface orthogonal to the front-rear direction is formed as a pressed part and a protrusion piece part 45 is formed that protrudes rearwards from an end part of an inner side of the pressed surface 44 in the radial direction. The pressed surface 44 is a rear end surface of the lower member 11 and therefrom, the protrusion piece part 45 protrudes further rearwards. The lower member 11 has a half-cut shape on the lower side, however, at a rear end part, the lower member 11 extends upwards for a predetermined length exceeding a lower-side half-circle (180 degrees). As illustrated in FIG. 10A, when looking at the rear end part of the lower member 11 from the rear, the rear end part of the lower member 11 has a shape from an upwardly open U-shape to C-shape, and the pressed surface 44 also has a shape from an upwardly open U-shape to C-shape. Furthermore, the protrusion piece part 45 is formed in a region of a predetermined length from among the entire circumference of the pressed surface 44 in the circumferential direction.

Figure 11:
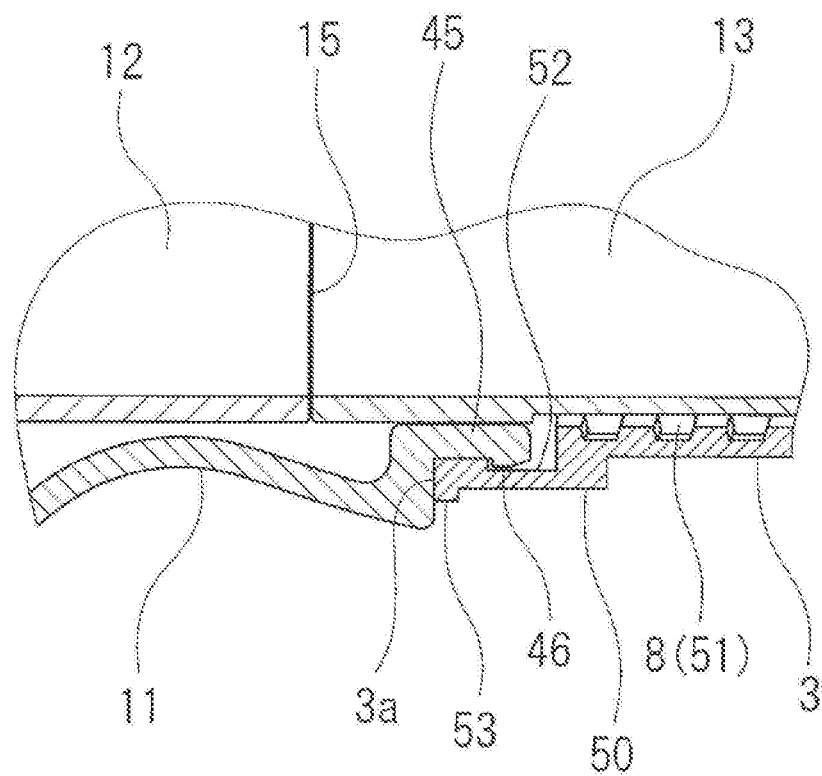
FIG. 11 is an enlarged view illustrating main parts of FIG. 4.

When seen from the rear, the protrusion piece part 45 has a shape from a U-shape to a C-shape corresponding to the pressed surface 44 and extends for a predetermined length exceeding the lower-side half-circle to the upper direction. However, the protrusion piece part 45 is not formed over the entire length of the pressed surface 44 in the circumferential direction and is not formed at both-end parts 44a of the pressed surface 44 in the circumferential direction. Thus, the both-end parts 44a of the pressed surface 44 in the circumferential direction extend more to the upper side than both-end parts 45a of the protrusion piece part 45 in the circumferential direction. The protrusion piece part 45 is formed by a thin wall, however, as illustrated in FIG. 11, at an outer surface of a tip end part of the protrusion piece part 45, an engaging protrusion 46 is arranged to protrude towards an outer side of the radial direction. The engaging protrusion 46 extends along a circumferential direction of the protrusion piece part 45 and is formed over an entire length of the protrusion piece part 45. As the engaging protrusion 46 is formed in this way at the tip end part of the protrusion piece part 45, the tip end part of the protrusion piece part 45 is locally thicker than the other portions of the protrusion piece part 45.

The lower member 11 is fitted to the fixed member from the lower side and by this fitting, the lower member 11 is held on the fixed member to an extent of not falling off naturally, even without the holding-use nut 3. Furthermore, an upper region from among an entire circumference of a connecting part 15 of the main body member 12 and the cylindrical member 13 is covered from an outer side of the radial direction by the cover piece unit 27 of the main body member 12 by screw-fastening the cylindrical member 13 to the main body member 12, however, a remaining lower region not covered by the cover piece unit 27 from among the entire circumference of the connecting part 15 is covered by the lower member 11 from the outer side of the radial direction by fitting the lower member 11 into the fixed member. Thus, when the lower member 11 is attached to the fixed member, the connecting part 15 of the main body member 12 and the cylindrical member 13 cannot be seen over the entire circumference.

Figure 9:
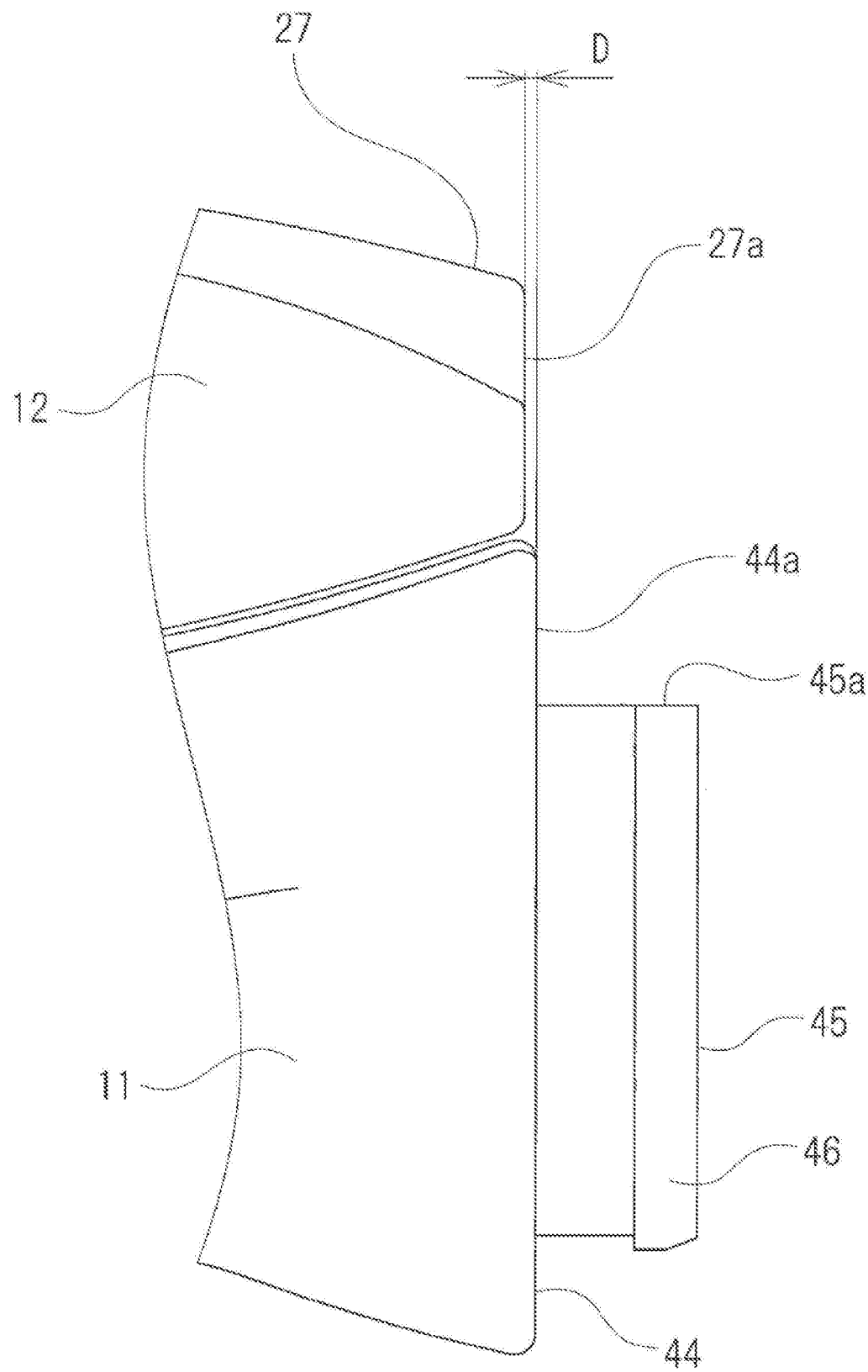
FIG. 9 is a front view of main parts illustrating a relationship of the main body member and the lower member of the reel seat and illustrates a state where the cylindrical member and the holding-use nut are detached.

In a state in which the lower member 11 is attached to the fixed member in this way, the pressed surface 44 of the lower member 11 is positioned on a lower side of a rear end surface 27a of the cover piece unit 27 of the main body member 12 and the protrusion piece part 45 of the lower member 11 is positioned on a lower side of the second bulging unit 32 of the cylindrical member 13. Furthermore, as illustrated in FIG. 9, the pressed surface 44 of the lower member 11 protrudes slightly more rearwards than the rear end surface 27a of the cover piece unit 27 of the main body member 12. A rearwards protrusion amount D of the pressed surface 44 of the lower member 11 with respect to the rear end surface 27a of the cover piece unit 27 of the main body member 12 is small and is 1 mm or less, preferably 0.1 mm or more and 0.5 mm or less. Thus, the pressed surface 44 of the lower member 11 protrudes slightly more rearwards than the rear end surface 27a of the cover piece unit 27 of the main body member 12 and therefore, mainly the pressed surface 44 of the lower member 11 is pressed by the holding-use nut 3 to the front side.

Holding-Use Nut 3

The holding-use nut 3 has a cylindrical shape and a diameter thereof may be constant, however, in the present embodiment, the holding-use nut 3 includes a plurality of portions having different diameters. The holding-use nut 3 includes at a front end part thereof a cylindrical cover unit 50 having a greater inner diameter than the other portions. The holding-use nut 3 includes at an inner peripheral surface thereof a female screw unit 51 into which the holding-use male screw unit 8 is screwed, however, the inner diameter of the cover unit 50 is greater than the female screw unit 51.

The cover unit 50 covers the protrusion piece part 45 of the lower member 11 and the second bulging unit 32 of the cylindrical member 13 from an outer side in the radial direction. An engaging groove 52 that extends in the circumferential direction is formed over the entire circumference on an inner peripheral surface of the cover unit 50. That is, the engaging groove 52 is ring-shaped. The engaging protrusion 46 of the lower member 11 is engaged with the engaging groove 52 of the holding-use nut 3. The engaging groove 52 is formed at a position on an inner side at a predetermined length from the tip end part from among the inner peripheral surface of the cover unit 50. Thus, when the holding-use nut 3 is fastened, an inner peripheral surface of the tip end part of the cover unit 50 of the holding-use nut 3 surpasses the engaging protrusion 46 of the protrusion piece part 45 of the lower member 11 and thereafter, the engaging protrusion 46 of the protrusion piece part 45 of the lower member 11 is engaged with the engaging groove 52 of the cover unit 50 of the holding-use nut 3.

A front end surface 3a of the holding-use nut 3 constitutes a pressing unit configured to press the pressed surface 44 of the lower member 11 to the front side. The outer peripheral surface of the cover unit 50 of the holding-use nut 3 may have the same diameter as the other portions, however, in the present embodiment, the outer peripheral surface of the cover unit 50 of the holding-use nut 3 has a greater diameter than the other portions. On a front end part of the outer peripheral surface of the cover unit 50, a ring-shaped flange part 53 is arranged to protrude towards the outer side of the radial direction. When the ring-shaped flange part 53 is disposed in this way on the outer peripheral surface of the front end part of the holding-use nut 3, a surface area of the front end surface 3a of the holding-use nut 3 can be enlarged.

The female screw unit 51 is formed on a rear side of the cover unit 50 and an inner peripheral surface from a rear end part of the female screw unit 51 to a rear end part of the holding-use nut 3 is a smooth surface. Note that, as illustrated by a two-dot chain line in FIGS. 1 and 2, a cylindrical grip body 16 is mounted on an outer side of the holding-use nut 3. The grip body 16 is formed by EVA foam, cork, or the like, for example.

Materials

Each of the main body member 12, the cylindrical member 13, the lower member 11, and the holding-use nut 3 may be formed by injection molding. Various types of synthetic resins may be used as a material, and the same material may be used, however, it is preferable to use different materials. In particular, for the main body member 12 and the lower member 11, it is preferable to use a material having relatively high strength compared to the cylindrical member 13 and the holding-use nut 3. A fiber-reinforced resin is preferable as the material of the main body member 12 and the lower member 11, in particular, a fiber-reinforced resin in which short fibers of a length of 1 mm or less are used as the reinforced fiber is preferable. Furthermore, carbon fibers are preferable as the fiber. On the other hand, a material of the cylindrical member 13 and the holding-use nut 3 may also be various types of hard synthetic resins, and it is preferable to use a fiber-reinforced resin, for example, it is possible to use a glass fiber-reinforced nylon resin.

Figure 12:
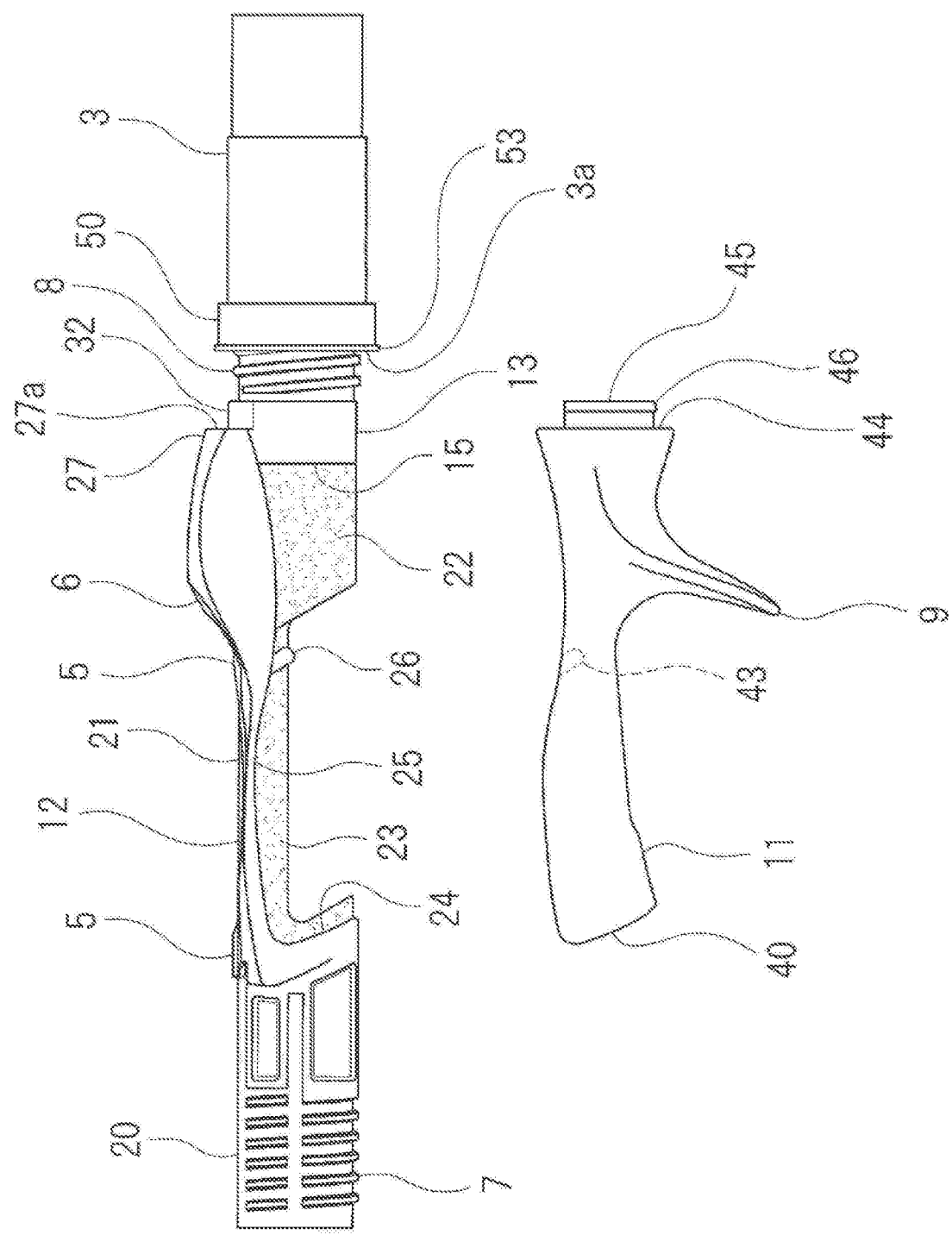
FIG. 12 is a front view illustrating a usage state of the reel seat.
Figure 13:
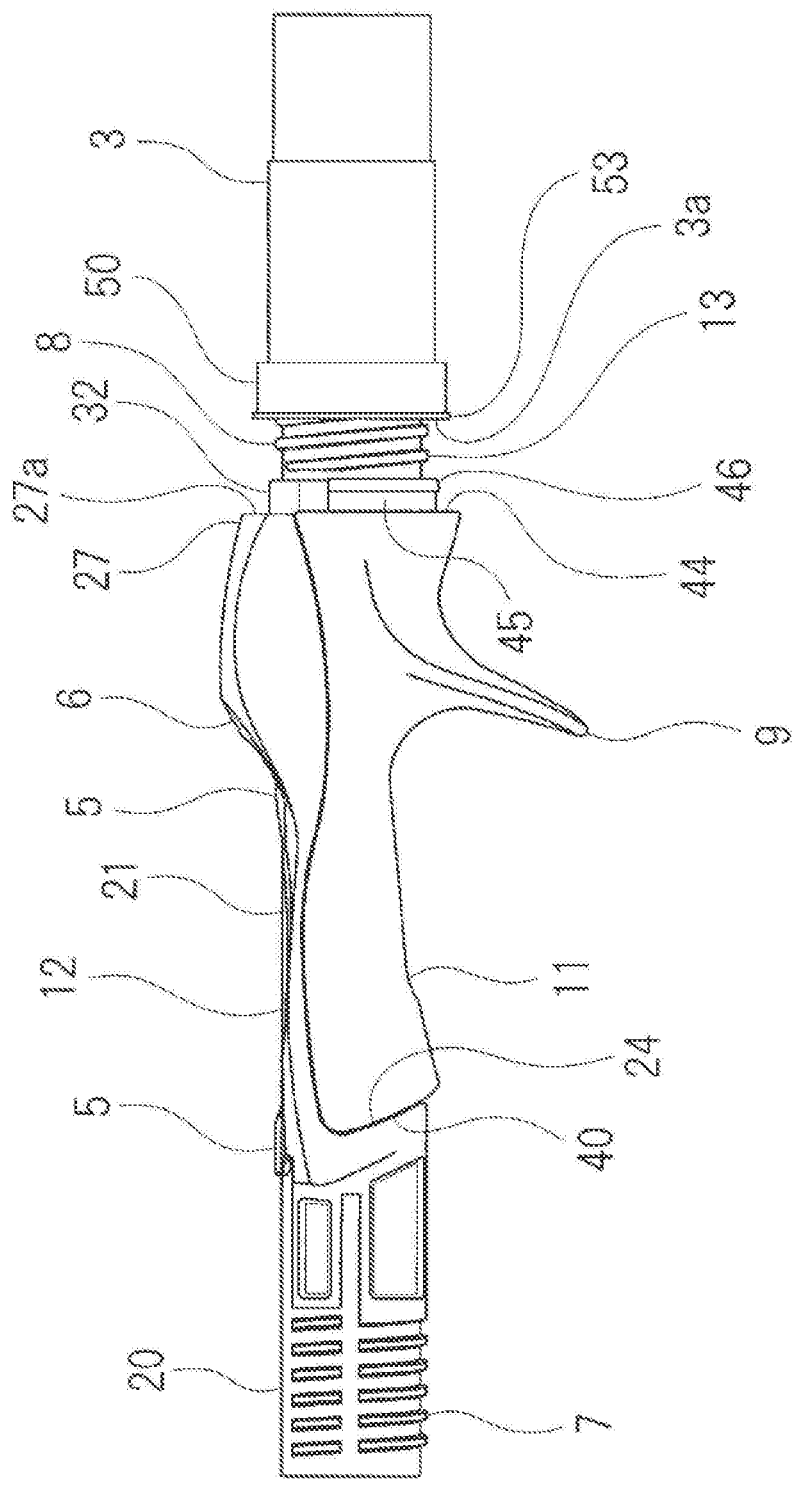
FIG. 13 is a front view illustrating the usage state of the reel seat.

In the reel seat configured as described above, the lower member 11 is fit into the main body member 12 and the cylindrical member 13 from the lower side in a state where the holding-use nut 3 is loosened, as illustrated in FIG. 12. As illustrated in FIG. 13, the lower member 11 is maintained in this state by the fitting force, without falling down. In this state, the holding-use nut 3 is rotated and moved to the front side. The holding-use nut 3 is moved to the front side while being rotated and the cover unit 50 of the holding-use nut 3 eventually reaches the protrusion piece part 45 of the lower member 11. The engaging protrusion 46 is formed on the outer peripheral surface of the protrusion piece part 45 of the lower member 11 and thus, the inner peripheral surface of the cover unit 50 of the holding-use nut 3 forcibly advances to the front side, while surpassing the engaging protrusion 46 of the protrusion piece part 45 of the lower member 11. Subsequently, when the engaging groove 52 of the cover unit 50 of the holding-use nut 3 engages with the engaging protrusion 46 of the protrusion piece part 45 of the lower member 11, the front end surface 3a of the holding-use nut 3 contacts the pressed surface 44 of the lower member 11 and when the holding-use nut 3 is further strongly fastened, the holding-use nut 3 pushes the lower member 11 to the front side. In a state where the lower member 11 is attached in this way, the cylindrical member 13 is covered by the holding-use nut 3 and cannot be seen.

The front end part 40 of the lower member 11 is locked by the inclined surface (the front stepped unit 24) that is the locking unit of the main body member 12 and thus, the front end part 40 of the lower member 11 is prevented from falling down. On the other hand, in the rear end part of the lower member 11, the protrusion piece part 45 is covered by the cover unit 50 of the holding-use nut 3 from the outer side of the radial direction and thus, the rear end part of the lower member 11 is also prevented from falling down. Furthermore, the holding-use nut 3 pushes the lower member 11 to the front side and thus, the lower member 11 is sandwiched from the front side and rear side thereof by the holding-use nut 3 and the main body member 12. Thus, a tight attached state is obtained, in which the lower member 11 does not wobble or the like. Furthermore, when the holding-use nut 3 pushes the lower member 11 to the front side, a force to the upper side is exerted on the front end part 40 of the lower member 11 by the front stepped unit 24 that is the inclined surface of the main body member 12, and the lower member 11 automatically moves to the upper side that is the side of the main body member 12 and firmly attaches to the main body member 12.

The lower member 11 is pushed by the holding-use nut 3 and thus, the midway part of the lower member 11 in the front-rear direction can be displaced downwards, however, the locking projection units 26 are formed as intermediate locking units on the main body member 12 and engage with the locking recessed units 43 of the lower member 11 and thus, the midway part of the lower member 11 in the front-rear direction is less likely to be displaced or moved downwards and the lower member 11 is fixed more tightly. In particular, the locking projection units 26 and the locking recessed units 43 are inclined in the same direction as the inclined surface (the front stepped unit 24) of the main body member 12 and thus, when the lower member 11 is pushed to the front side by the holding-use nut 3, the force to the upper side is exerted not only on the front end part 40 of the lower member 11, but also on the midway part, and thus, the lower member 11 can be pressed and fixed to the main body member 12 tightly over the entire length.

Furthermore, the engaging protrusion 46 is formed on the outer peripheral surface of the protrusion piece part 45 of the lower member 11 and engages with the engaging groove 52 of the holding-use nut 3 and thus, the lower member 11 can be fixed more tightly and the attached state can be maintained. In particular, the protrusion piece part 45 surpasses the lower-side half-circle to extend to the upper side and the engaging protrusion 46 is formed over the entire length of the protrusion piece part 45 in the circumferential direction and thus, the engaged state between the engaging groove 52 and the engaging protrusion 46 becomes more secure and a fixation force of the lower member 11 can be increased. Furthermore, the pressed surface 44 extends further to the upper side than the protrusion piece part 45 and thus, the compressive force from the holding-use nut 3 can also be surely exerted on the lower member 11.

On the other hand, when the lower member 11 is detached, the holding-use nut 3 is moved, from a state as illustrated in FIG. 1 where the lower member 11 is attached, rearwards by rotating to the opposite side as illustrated in FIG. 13, and the lower member 11 can easily be detached from the fixed member by pulling the lower member 11 downwards as illustrated in FIG. 12. Thus, the lower member 11 can be easily changed to another lower member 11 having a different shape and position of the trigger 9, or material, color, design, and the like of the lower member 11, and the fisher can enjoy freely customizing the reel seat in accordance with the fisher's preference, the type of the reel, the type of targeted fish, the condition, and the like. Furthermore, the through hole 10 is formed, for example, in the lower member 11 described above, however, in accordance with the preference, condition, and the like, the lower member 11 can also be changed to one without the through hole 10. Such a change of the lower member 11 can be performed in a state where the reel seat is attached to the fishing rod and thus, the fisher himself can easily perform the change, for example, the change can also easily be performed on the location of fishing and further, the change is also possible in the state where the reel is attached. In particular, the change is possible only by a manipulation to the holding-use nut and thus, the changing operation is extremely simple and the change can be performed quickly. Note that, even if the lower member 11 is detached, the reel leg mounting surface 5, the fixed hood unit 6, the moveable hood, and the hood-use nut remain unchanged on the reel seat and thus, the reel can also be mounted on a reel seat from which the lower member 11 is detached to perform fishing, and from this perspective, the lower member 11 may be treated as optional.

Furthermore, the fixed member is not configured as one member, but has a configuration that is divided into the main body member 12 and the cylindrical member 13, and thus, even if a situation emerges where specifications of a position and length of the holding-use male screw unit 8 need to be changed in accordance with a type of the fishing rod on the manufacturer's side, for example, it is sufficient to change only a metal mold of the cylindrical member 13 and a metal mold of the main body member 12 does not need to be changed.

Figure 14:
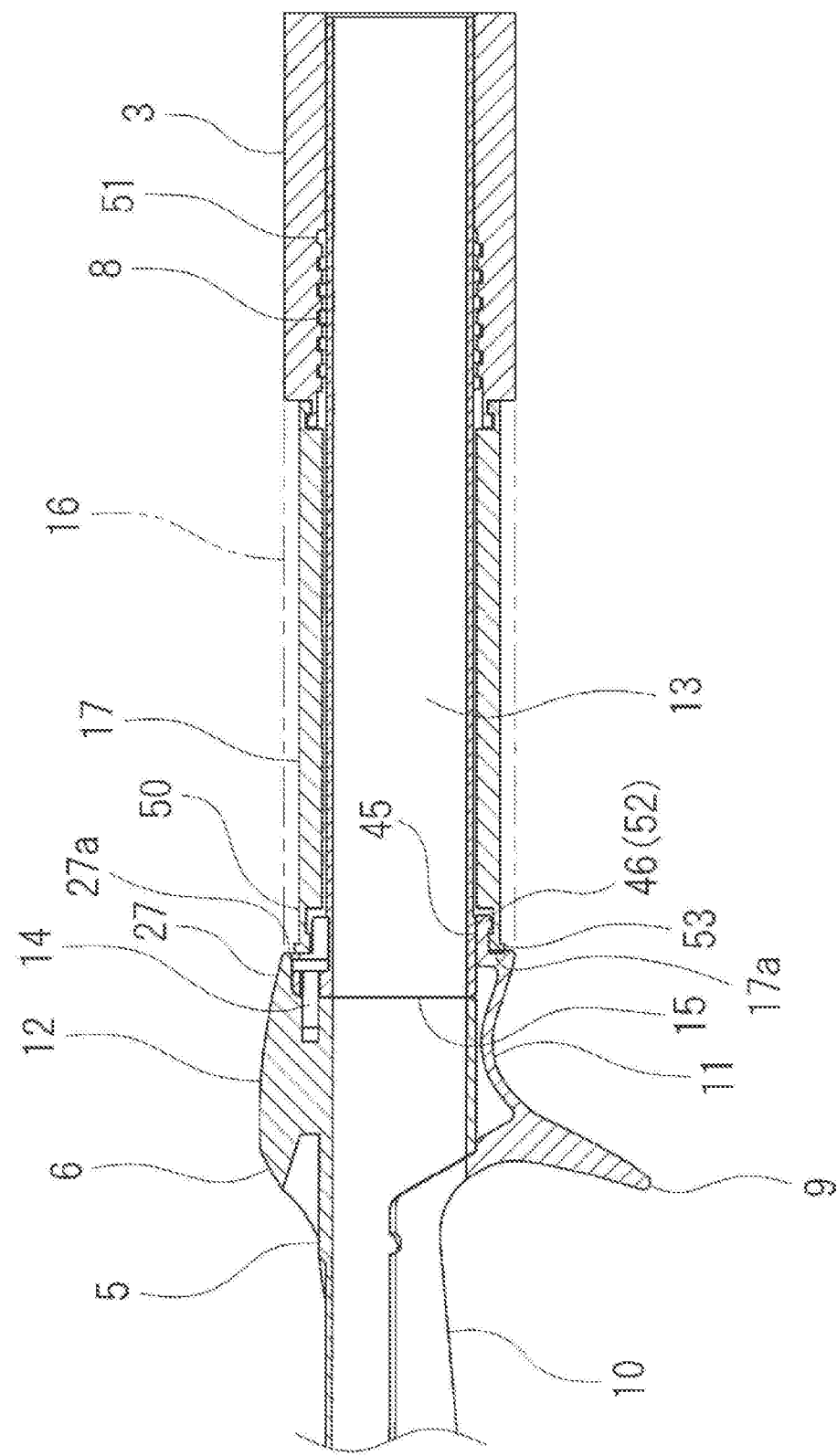
FIG. 14 is a longitudinal sectional view of main parts of the reel seat according to another embodiment of the present invention.

Note that, in the configuration in the present embodiment, the holding-use nut 3 that is the holding member pushes directly onto the lower member 11, however, a configuration where the holding-use nut 3 pushes the lower member 11 indirectly via another member is also possible. For example, as illustrated in FIG. 14, a configuration where the holding-use nut 3 and a pressing cylindrical body 17 are provided as the holding member, is also possible. The holding-use nut 3 is located at a position separated rearwards from the lower member 11 and the pressing cylindrical body 17 is positioned between the holding-use nut 3 and the lower member 11. The pressing cylindrical body 17 is mounted on the outside of the cylindrical member 13 and is movable in the front-rear direction with respect to the cylindrical member 13, however, cannot rotate around the axis. That is, a rear end part of the pressing cylindrical body 17 is locked rotatably relative to a front end part of the holding-use nut 3 and the pressing cylindrical body 17 does not rotate, even if the holding-use nut 3 rotates. Thus, the pressing cylindrical body 17 can be moved by sliding to the front-rear by rotating the holding-use nut 3. In this case, a front end surface 17a of the pressing cylindrical body 17 presses the pressed surface 44 of the lower member 11. Thus, the front end surface 17a of the pressing cylindrical body 17 becomes the pressing unit. Furthermore, the cylindrical cover unit 50 is formed on a front end part of the pressing cylindrical body 17 and the engaging groove 52 is formed on an inner peripheral surface of the cover unit 50.

In such a configuration where the pressing cylindrical body 17 is provided between the holding-use nut 3 and the lower member 11, the holding-use nut 3 is separated rearwards from the lower member 11. Thus, also an entire length of the cylindrical member 13 becomes longer in accordance with this and the holding-use male screw unit 8 is provided on an outer peripheral surface of a rear part of the cylindrical member 13. Furthermore, on the outer peripheral surface of the front part of the cylindrical member 13, a recessed groove (not illustrated) in which a protrusion (not illustrated) of an inner peripheral surface of the pressing cylindrical body 17 engages, is formed along the front-rear direction and thus, the pressing cylindrical body 17 can move by sliding in the front-rear direction. Also in such a configuration, the main body member 12 has the same configuration as described above and thus, it is not necessary to change the metal mold of the main body member 12; only the metal mold of the cylindrical member 13 may be changed. Furthermore, as illustrated by two-dot chain lines in FIG. 14, the cylindrical grip body 16 is mounted on an outer side of the pressing cylindrical body 17 and the holding-use nut 3 is positioned on a rear side of the grip body 16 in this configuration. Thus, during fishing, there is the advantage that a hand holding the reel is unlikely to touch the holding-use nut 3 and the holding-use nut 3 is unlikely to loosen.

Note that, in the above-described embodiment, the lower member 11 includes the trigger 9, however, a configuration not including the trigger 9 is also possible.

REFERENCE SIGNS LIST

1 Rod main body
3 Holding-use nut (Holding member)
3a Front end surface (Pressing unit)
4 Rod insertion aperture
5 Reel leg mounting surface
6 fixed hood unit
7 Hood-use male screw unit
8 Holding-use male screw unit
9 Trigger
10 Through hole
11 Lower member
12 Main body member
12a Rear end surface
13 Cylindrical member
13a Front end surface
14 Screw
15 Connecting part
16 Grip body
17 Pressing cylindrical body (Holding member)
17a Front end surface (Pressing unit)
20 Front tube unit
21 Half-cut unit
22 Rear tube unit
23 Overlapping surface
24 Front stepped unit (Inclined surface, Receiving unit, Locking unit)
25 Upper stepped unit
26 Locking projection unit (Intermediate locking unit)
27 Cover piece unit
27a Rear end surface
28 Prepared hole
31 First bulging unit
32 Second bulging unit
33 Counterbore recessed unit
34 Screw-use through hole
35 Recessed groove
40 Front end part
41 Overlapping surface
42 Wall surface of rod insertion aperture
43 Locking recessed unit
44 Pressed surface
44a End part of circumferential direction
45 Protrusion piece part
45a End part of circumferential direction
46 Engaging protrusion
50 Cover unit
51 Female screw unit
52 Engaging groove
53 Flange part

The invention claimed is:

1. A reel seat comprising a cylindrical reel seat main body attached to a predetermined position of a rod main body, wherein
the cylindrical reel seat main body comprises a fixed member fixed to the rod main body and comprising, on an upper surface, a reel leg mounting surface for mounting a reel leg, and a lower member formed separately from the fixed member and configured to form a lower region on an opposite side of the reel leg mounting surface, and that is detachably attached to the fixed member in a state where the fixed member is attached to the rod main body, and
the reel seat comprises a holding member for holding the lower member attached to the fixed member,
wherein the fixed member comprises a locking unit configured to lock one end part of the lower member in an axial direction so that the one end part does not depart from the fixed member into a lower direction, and the holding member comprises a cover unit moveable in the axial direction with respect to the fixed member and configured to cover another end part of the lower member in the axial direction from a lower side.

2. The reel seat according to claim 1, wherein the holding member comprises a pressing unit configured to press, in the axial direction, the other end part of the lower member in the axial direction, the fixed member comprises a receiving unit configured to receive the one end part of the lower member in the axial direction, and the lower member is sandwiched in the axial direction by the fixed member and the holding member.

3. The reel seat according to claim 2, wherein the receiving unit comprises an inclined surface ascending toward the one end part in the axial direction and the inclined surface constitutes the locking unit.

4. The reel seat according to claim 2, wherein the fixed member comprises an intermediate locking unit configured to restrict a downward movement of the midway part of the lower member in the axial direction.

5. The reel seat according to claim 2, wherein the fixed member comprises a fixed hood unit in which one end part of the reel leg is inserted, a hood-use male screw unit positioned at an outer peripheral surface on a side of the one end part in the axial direction and into which a hood-use nut is screwed for moving in the axial direction and fixing in a predetermined position a moveable hood in which another end part of the reel leg is inserted, and a holding-use male screw unit positioned more at an outer peripheral surface at the side of the other end part in the axial direction than the fixed hood unit, and the holding member comprises a holding-use nut screwed into the holding-use male screw unit of the fixed member.

6. The reel seat according to claim 5, wherein the other end part of the lower member in the axial direction has a bent form in a circumferential direction when seen from the axial direction, a pressed surface orthogonal to the axial direction and a protrusion piece part protruding from an inner side in a radial direction of the pressed surface into the axial direction, are formed in the other end part of the lower member in the axial direction, the holding member is cylindrical and one end part of the holding member constitutes a cylindrical cover unit, one end surface of the holding member constitutes the pressing unit, and the cylindrical cover unit of the holding member is configured to cover the protrusion piece part of the lower member from an outer side in the radial direction, and the one end surface of the holding member exerts pressure on the pressed surface of the lower member.

7. The reel seat according to claim 6, wherein the protrusion piece part of the lower member extends along the circumferential direction, an engaging protrusion extending in the circumferential direction is arranged on an outer peripheral surface of the protrusion piece part to protrude to the outer side in the radial direction, an engaging groove extending in the circumferential direction is formed on an inner peripheral surface of the cylindrical cover unit of the holding member, and the engaging protrusion of the lower member engages with the engaging groove of the holding member.

8. The reel seat according to claim 7, wherein the protrusion piece part extends upwards beyond a length of a lower-side half-circle and the engaging protrusion is formed over an entire length of the protrusion piece part in the circumferential direction.

9. The reel seat according to claim 8, wherein the pressed surface extends further to an upper side than the protrusion piece part.

10. The reel seat according to claim 5, wherein the fixed member comprises a main body member formed by injection molding and in which the reel leg mounting surface, the fixed hood unit, and the hood-use male screw unit are formed, and a cylindrical member formed by injection molding, formed separately from the main body member, and connected to a side of another end part of the main body member in the axial direction, and the holding-use male screw unit is formed in the cylindrical member.

11. The reel seat according to claim 10, wherein a cover piece unit being arc-shaped when seen from the axial direction, is arranged on the other end part of the main body member in the axial direction to protrude into the axial direction and from among an entire circumference of a connecting part of the main body member and the cylindrical member, an upper region is covered by the cover piece unit of the main body member from an outer side in the radial direction and a remaining lower region is covered by the lower member from an outer side in the radial direction.

12. The reel seat according to claim 11, wherein a pressed surface orthogonal to the axial direction is formed on the other end part of the lower member in the axial direction, one end surface of the holding member presses the pressed surface, and the pressed surface of the lower member protrudes slightly more to a side of the other end part of the axial direction than an end surface of the cover piece unit of the main body member.

13. The reel seat according to claim 5, wherein the holding member comprises a pressing cylindrical body that is moveable in the axial direction, but not rotatable, and a holding-use nut positioned on a side of another end part of the pressing cylindrical body in the axial direction, locked rotatably relative to the pressing cylindrical body, and configured to move the pressing cylindrical body in the axial direction.

14. A fishing rod comprising the reel seat according to claim 1.

* * * * *